US010249908B2

(12) United States Patent
Keates

(10) Patent No.: US 10,249,908 B2
(45) Date of Patent: Apr. 2, 2019

(54) SYSTEMS, METHODS AND DEVICES FOR CREATING A LI-METAL EDGE-WISE CELL

(71) Applicant: INTEL CORPORATION, Santa Clara, CA (US)

(72) Inventor: Andrew W. Keates, Los Gatos, CA (US)

(73) Assignee: INTEL CORPORATION, Santa Clara, CA (US)

(*) Notice: Subject to any disclaimer, the term of this patent is extended or adjusted under 35 U.S.C. 154(b) by 263 days.

(21) Appl. No.: 15/383,929

(22) Filed: Dec. 19, 2016

(65) Prior Publication Data
US 2018/0006332 A1 Jan. 4, 2018

Related U.S. Application Data

(60) Provisional application No. 62/357,553, filed on Jul. 1, 2016.

(51) Int. Cl.
H01M 10/0583 (2010.01)
H01M 10/0525 (2010.01)
H01M 4/134 (2010.01)
H01M 2/30 (2006.01)
H01M 2/34 (2006.01)
H01M 2/02 (2006.01)
(Continued)

(52) U.S. Cl.
CPC ..... H01M 10/0583 (2013.01); H01M 2/0217 (2013.01); H01M 2/266 (2013.01); H01M 2/30 (2013.01); H01M 2/34 (2013.01); H01M 2/348 (2013.01); H01M 4/134 (2013.01); H01M 10/0436 (2013.01); H01M 10/0468 (2013.01); H01M 10/052 (2013.01); H01M 10/0525 (2013.01); H01M 10/0585 (2013.01); H01M 2004/028 (2013.01); H01M 2200/00 (2013.01); H01M 2200/103 (2013.01); H02J 7/0029 (2013.01); H02J 2007/0037 (2013.01); H02J 2007/0098 (2013.01)

(58) Field of Classification Search
CPC ......... H01M 10/0436; H01M 10/0468; H01M 10/052; H01M 10/0525; H01M 10/0583; H01M 10/0585; H01M 2004/028; H01M 2200/00; H01M 2200/103; H01M 2/0217; H01M 2/266; H01M 2/30; H01M 2/34; H01M 2/348; H01M 4/134
See application file for complete search history.

(56) References Cited

U.S. PATENT DOCUMENTS 6,461,762 B1 10/2002 Yang et al.
6,645,675 B1 11/2003 Munshi
(Continued)

FOREIGN PATENT DOCUMENTS

JP 2006134697 A 5/2006

OTHER PUBLICATIONS

PCT/US2017/034301, International Search Report and Written Opinion, dated Aug. 22, 2017, 10 pages.

Primary Examiner — Carlos Barcena
(74) Attorney, Agent, or Firm — Stoel Rives LLP

(57) ABSTRACT

A new battery cell structure uses a battery cell structure comprising a plurality of strips so that only a fraction of the power in the cell can be fed to a dendrite which has shorted an anode and cathode. The dendrite still occurs, but can be rendered benign. In addition, a fuse can be added to the cell structure so that shorted cells can be removed from the circuit.

27 Claims, 12 Drawing Sheets

(51) Int. Cl.
    *H01M 2/26*     (2006.01)
    *H01M 10/04*     (2006.01)
    *H01M 10/052*     (2010.01)
    *H01M 10/0585*     (2010.01)
    *H01M 4/02*     (2006.01)
    *H02J 7/00*     (2006.01)

(56) References Cited

U.S. PATENT DOCUMENTS

| | | | |
|---|---|---|---|
| 2005/0118504 A1* | 6/2005 | Honda | H01M 4/0426 |
| | | | 429/218.1 |
| 2010/0247987 A1 | 9/2010 | Holung et al. | |
| 2014/0037996 A1 | 2/2014 | Whitacre et al. | |

* cited by examiner

SYSTEMS, METHODS AND DEVICES FOR CREATING A LI-METAL EDGE-WISE CELL

RELATED APPLICATION

This application claims the benefit under 35 U.S.C. § 119(e) of U.S. Provisional Application No. 62/357,553 filed Jul. 1, 2016, which is incorporated by reference herein in its entirety.

TECHNICAL FIELD

The present disclosure relates to batteries and more specifically to construction of a battery that minimizes effects of dendrites in a Lithium metal battery.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a battery cell structure so that only a fraction of the power in the cell can be fed to a dendrite which has shorted an anode and cathode. The dendrite still occurs, but is rendered benign. In addition, a fuse can be added to the cell structure so that shorted cell elements can be removed from the circuit.

An anode for a Li-ion battery can be Lithium in its metallic form. This can increase the energy density of cells by about 20% compared to conventional graphitic anodes. Li-Metal anodes have not been practical for at least a few reasons. These reasons include (1) dendrite formation and (2) stack pressure.

Figure 1:
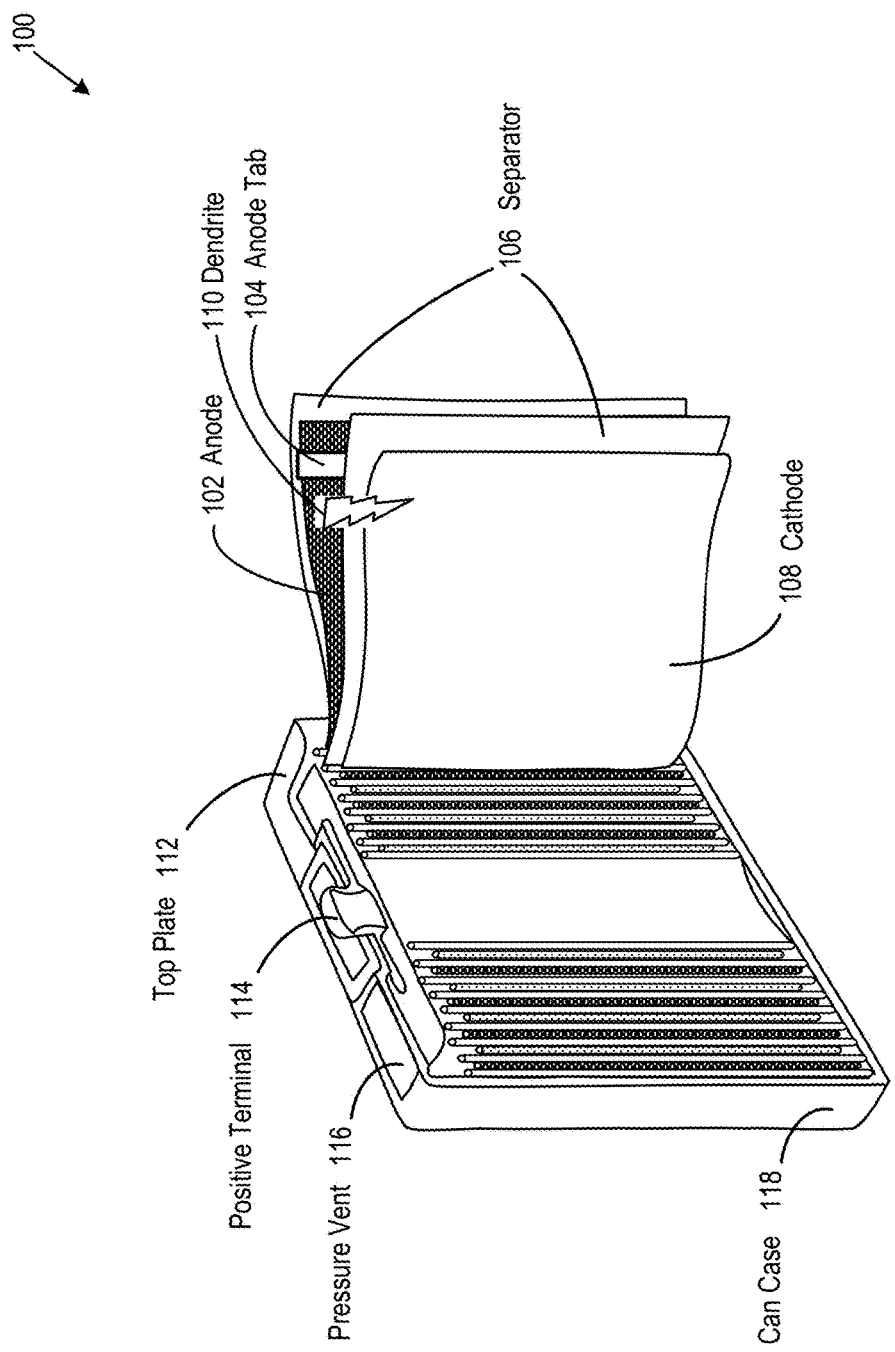
FIG. 1 is a diagram illustrating a Lithium-metal (Li-Metal) battery system with a dendrite consistent with embodiments disclosed herein.

FIG. 1 shows a Lithium-metal (Li-Metal) battery 100 with a dendrite 110. The battery 100 is formed from a set of layers that include an anode 102 separated from a cathode 108 by a separator 106. These layers can be stacked, such as by wrapping around a central area. When wrapping, a second separator 106 can be used. The anode 102 can include an anode tab 104 that joins anode current collectors and provides an electrical connection to a negative terminal (not shown) of a can case 118. A top plate 112 can seal the layers inside the can case 118. The top plate 112 can include a positive terminal 114 and a pressure vent 116. The positive terminal 114 can be electrically coupled to one or more cathode layers 108. The pressure vent 116 can provide a pressure exit when pressure builds up beyond a threshold value (such as in the case of a catastrophic failure).

With regard to (1) dendrite 110 formation, when the battery 100 is charged, the Lithium is not deposited on the anode 102 as a uniform metal film. The Lithium forms as granules. Each of these granules becomes coated with a passivation layer, called a "surface electrolyte interphase" (SEI) layer. As the grains swell, this layer 102 cracks. Lithium that deposits in the crack can eventually cause a growth called a dendrite 110 as repeated crack/repair events occur. The dendrite 110, in rare cases, will grow long enough to pierce the separator 106 and short-circuit the anode 102 and cathode 108, potentially causing a catastrophic battery failure.

With regard to (2) stack pressure, without stack pressure the Lithium granules deposited at the anode 102 during battery charging may become disassociated with each other, not all touching each other and not touching a copper foil current collector which conducts electrons out of the battery 100 via the negative terminal. Disconnected, these granules are no longer part of the charge/discharge processes. Stack pressure of 50 to 150 PSI applied to the sides of the battery 100 can be used to hold the granules together. This is achievable in a cylindrical cell, which can withhold pressure in the cylinder, but can be difficult to implement in a flat cell. The flat sides can bulge and not hold the anode particles (granules) in place as well.

This disclosure focuses on (1) dendrite formation. Instead of attempting to stop Li-Metal dendrites, which are rare but potentially catastrophic, designs disclosed herein are formed with consideration to dendrites occurring. For example, one design fuses out a small part of the cell when dendrites occur and short too much current. When a cell becomes disabled through a dendrite, 1-5% of the cell capacity can be lost or a modest self-discharge can occur. A catastrophic event is possible if the entire energy of the call can be discharged into a short, but a partitioned cell, as proposed here, will limit current into a short and greatly diminish the likelihood of a catastrophic failure.

It should be noted that the proposed cell construction can also improve the energy density of the cells by virtue of the ability of the cell to contain pressure and the fact that less of the cell is used for current collector layers, since each current collector is thinner than in a regular cell. The ability of the cell to arrest thermal runaway will increase the safety of the cells.

Figure 2:
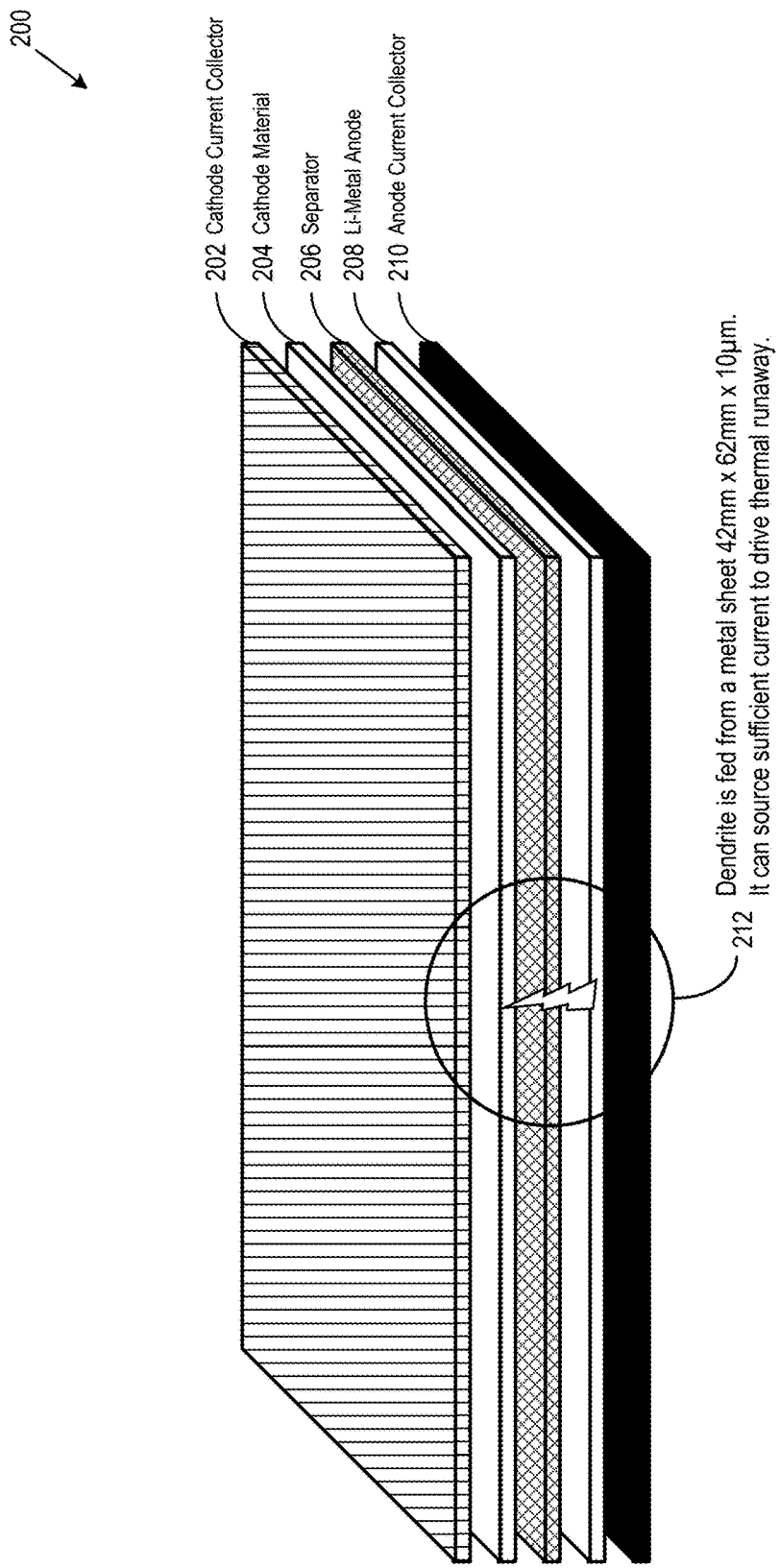
FIG. 2 is a diagram illustrating a Li-Metal battery system with sheets with a dendrite consistent with embodiments disclosed herein.

FIG. 2 shows a battery 200 formed from a stack of sheets using a sheet construction. In FIG. 2, each sheet is approximately 42 mm by 62 mm by 10 μm. The sheets include one or more cathode current collectors 202, one or more cathode materials 204, one or more separators 206, one or more Li-Metal anodes 208, and one or more anode current collectors 210. The current collectors 202, 210 function to collect and transfer charge to or from the anode 208 or the cathode material 204. The cathode material 204 and the anode 208 function to store charge. The separator 206 functions to keep the cathode material 204 separated from the anode material 208. For example, a cell-phone battery may measure 42 mm×62 mm×5 mm. In a regular cell example, the area of plates is 42 mm×62 mm=2,604 mm$^2$, or 4 square inches. In one embodiment, the separator is a little wider than then the anode and cathode layers for manufacturing tolerance and a possibility that the separator might shrink during use. While the layers are not the same size, the layers are approximately the same size.

If a dendrite 212 pierces the separator 206, it can source sufficient current for thermal runaway as each sheet contains a substantial portion of the battery charge. Though only one of each current collector sheet is illustrated in FIG. 2, it is common for cells to be made of multiple such layer sets 202, 204, 206, 208 and 210 in a rolled construction as illustrated in FIG. 1. The area depicted here is multiplied by the number of windings in the roll, as a continuous strip of metal foil (such as the current collectors 202 and 210) is wound inside the battery 200. This metal foil carries the full current of a discharging battery to the terminals (the positive terminal and the can case, as illustrated in FIG. 1). Thus, this metal foil is able to provide large amounts of current to a dendrite fault.

Figure 3:
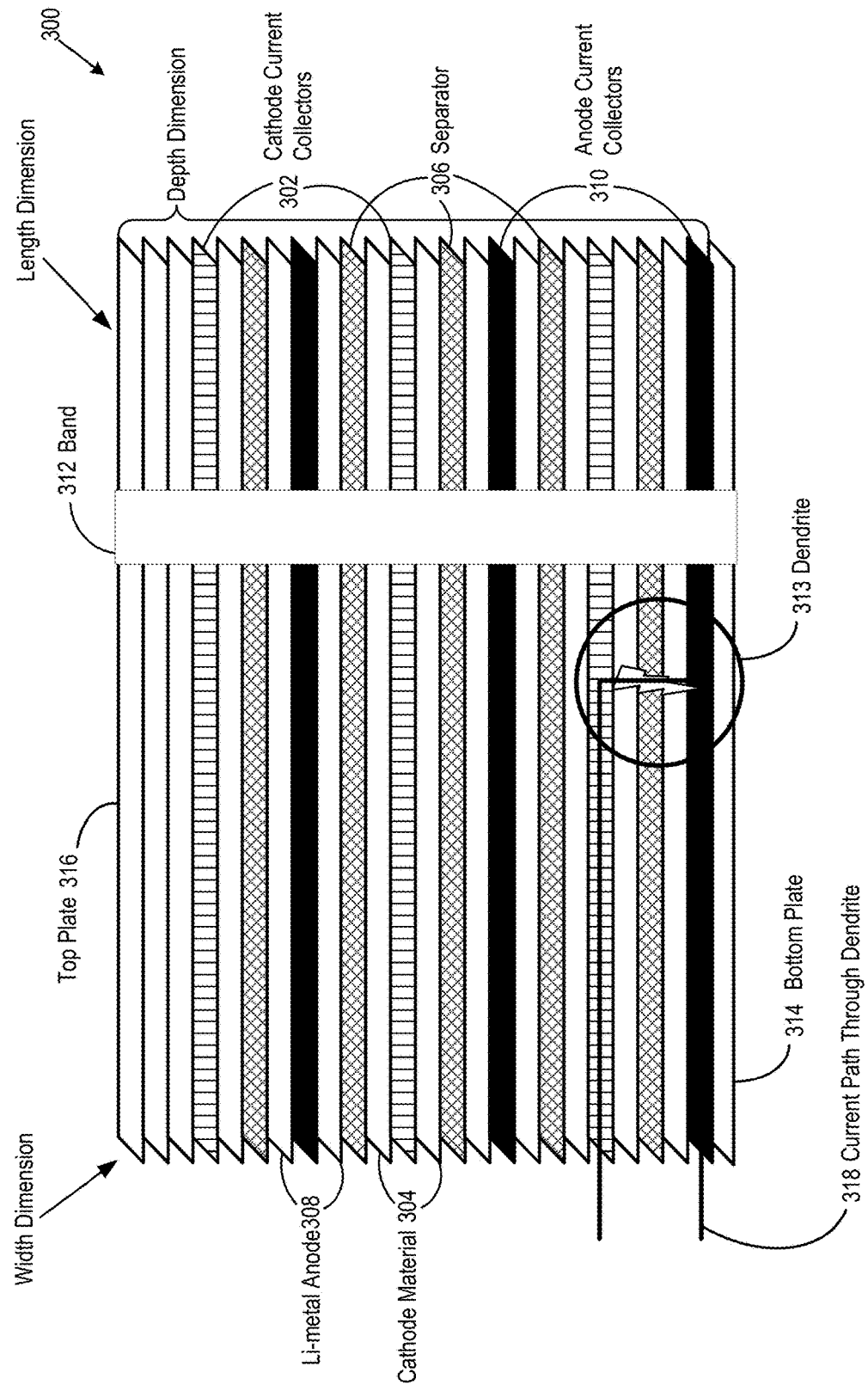
FIG. 3 is a diagram illustrating an edge-based Li-Metal battery system internal construction with a dendrite consistent with embodiments disclosed herein.

FIG. 3 shows a battery 300 formed with an edge-wise construction using strips 302, 304, 306, 308 and 310. To reduce the effect of a dendrite 313 and thermal runaway, an edge-wise construction can be used instead of the sheet construction shown in FIG. 2. An edge-on design is used to form the strips 302, 304, 306, 308 and 310. For example, an area of side edges is 5 mm×62 mm=310 mm$^2$, or 0.48 square inches in this example.

While other solutions attempt to prevent the dendrite 313 penetration and may lessen the frequency of occurrence, embodiments disclosed herein can partition the energy in the cell such that the dendrite 313 can still occur, but can be rendered benign by an inability of the cell to provide sufficient current for thermal runaway to occur.

In an embodiment of the strip construction, current delivered by the battery 300 is the sum of the current delivered by each thin current collector strip 302 and 310. In the sheet construction (or flat panel construction shown in FIG. 2), the current collectors 202 and 210 can be a single metal sheet taking all of the current from all of the battery 200. In contrast with the strip construction, a narrow, thin, current collector is likely incapable of conducting enough current into the short to cause thermal runaway. The line 318 in FIG. 3 shows the current path through the dendrite 313 short. The thin, narrow current collector strips 302 and 310 can be designed to impede the current and can be fused at one end (see FIG. 4). A collective current from many of the strips 302, 304, 306, 308 and 310 can be bussed together at the ends of the strips 302, 304, 306, 308 and 310 to enable the full battery 300 (i.e., the strips 302, 304, 306, 308 and 310 as a collective) to provide the same current as a traditional battery format. A band 312 can be placed around the strips 302, 304, 306, 308 and 310 with a rigid top plate 316 and rigid bottom plate 314 to provide sufficient stack pressure on the strips 302, 304, 306, 308 and 310.

Figure 4:
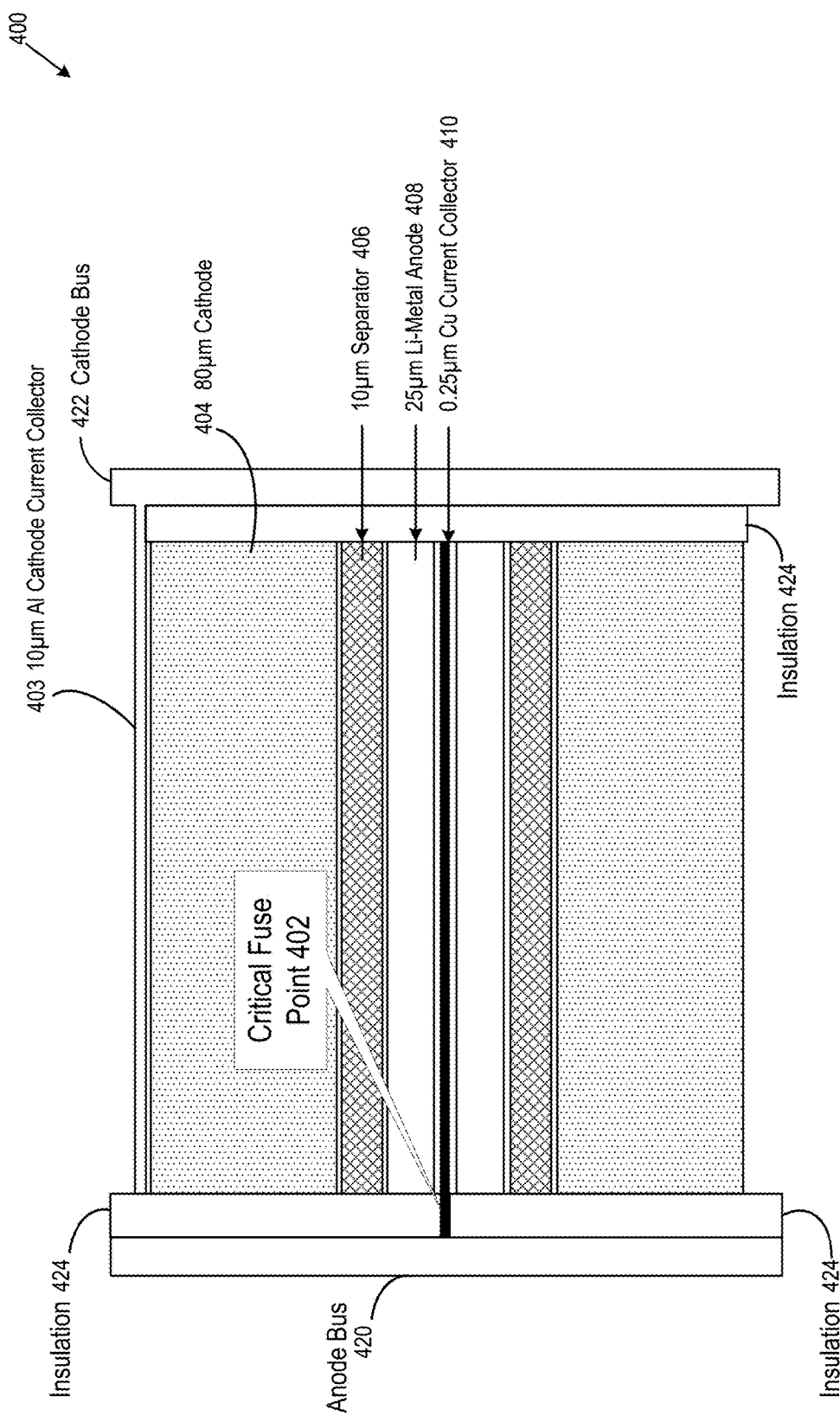
FIG. 4 is a diagram illustrating a Li-Metal battery system internal construction with a fuse consistent with embodiments disclosed herein.

FIG. 4 is a diagram illustrating a Li-Metal battery system 400 internal construction with a fuse 402 consistent with embodiments disclosed herein. The relative thicknesses of the layers 403, 404, 406, 408 and 410 are approximate, used herein for an example, and may be altered. For example, the battery system 400 can include a 10 μm Al cathode current collector 403 and an 80 μm cathode 404. The cathode current collector 403 can be connected to a cathode bus 422 which collects charge (e.g., voltage and/or current) from several layers of like current collectors. The cathode bus 422 can be separated from both the cathode 404 and an anode 408 by an insulation 424. A 10 μm separator 406 (formed from insulation) can separate the anode 408 from the cathode 404. The anode 408 can be made from Li-Metal. A 0.25 μm current collector 410 can collect from one or more anodes 408. The current collector 410 is substantially thinner than a traditional current collector and thereby saves space in the cell. In the embodiment shown, a double-sided construction is used such that the single current collector 410 can receive charge from anode active material applied to both sides. The current collector 410 for the Li-Metal anode 408 is shown with the fuse 402 before an anode bus 420. The fuse 402 can be configured to create an open circuit (e.g., through destruction or "blowing") when a current draw is above a set threshold or threshold range. The anode current collector 410 can be made of copper and connect to the anode bus 420.

In one embodiment, at least one current collector strip is fused at one end where it meets the anode bus 420 to remove one of many (e.g., 100+) current collector strips from the circuit in the event of a short. Alternatively, an event of a dendrite penetration can slowly discharge the cell via the thin and relatively resistive strip, rather than causing a catastrophic event as compared to if a wider, thicker copper foil were able to conduct current into the fault.

Figure 5:
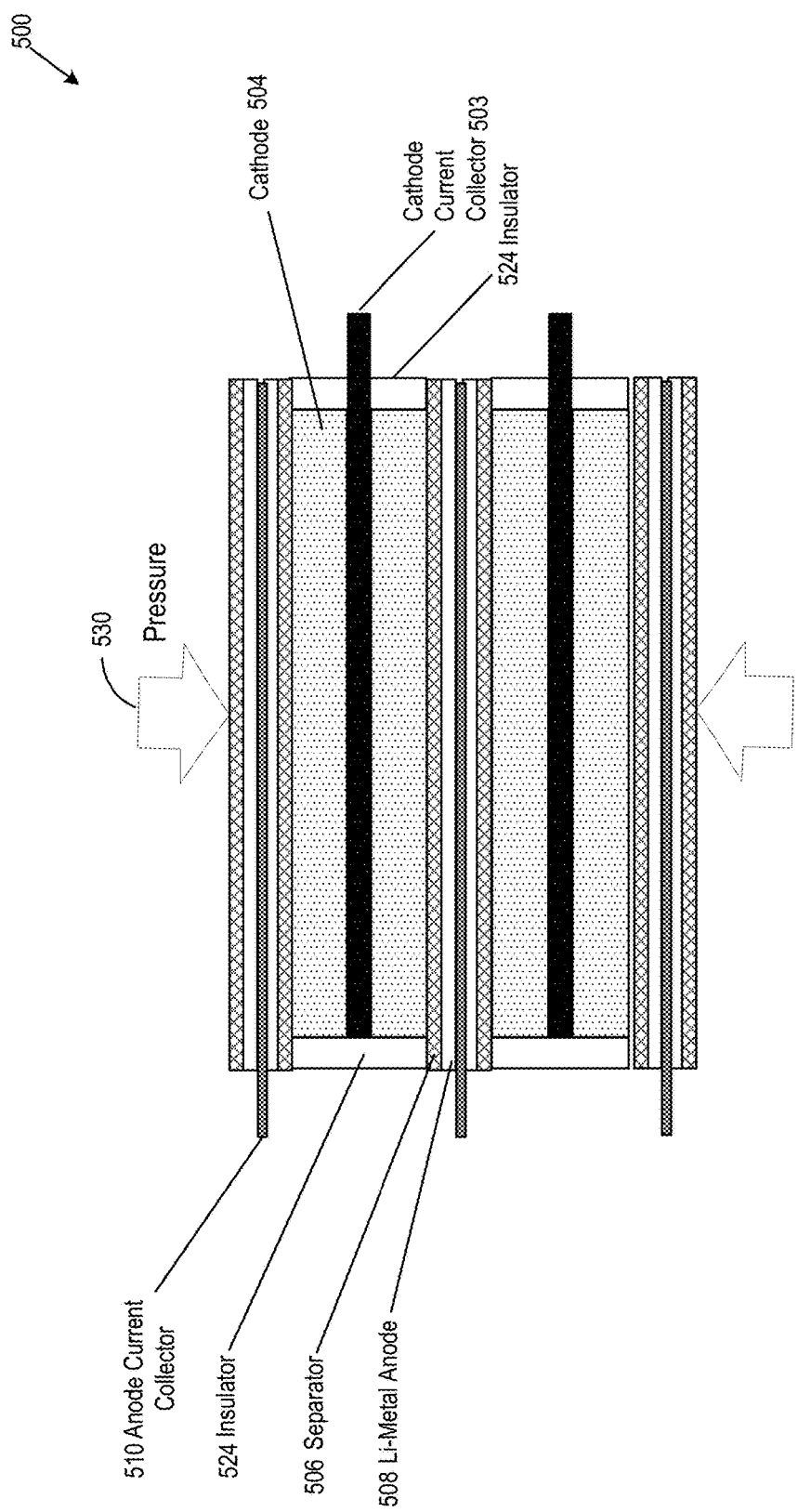
FIG. 5 is a diagram illustrating a basic Li-Metal battery system internal construction consistent with embodiments disclosed herein.

FIG. 5 is a diagram illustrating a basic Li-Metal battery system 500 internal construction consistent with embodiments disclosed herein. The battery system 500 can be constructed so that a single current collector 510 or 503 for an anode 508 or a cathode 504 can service two anode layers or two cathode layers. An insulator 524 can protect a bus (see FIGS. 9-10) for the anode 508 or the cathode 504 from coming into contact with the anode 508 or the cathode 504. In some embodiments, the insulator 524 can be an amorphous solid, such as a polymer. In some embodiments, a separator 506 may be folded over to form the insulator 524 shown in FIG. 5. Stack pressure 530 can be provided by end plates and/or a battery body.

Figure 6:
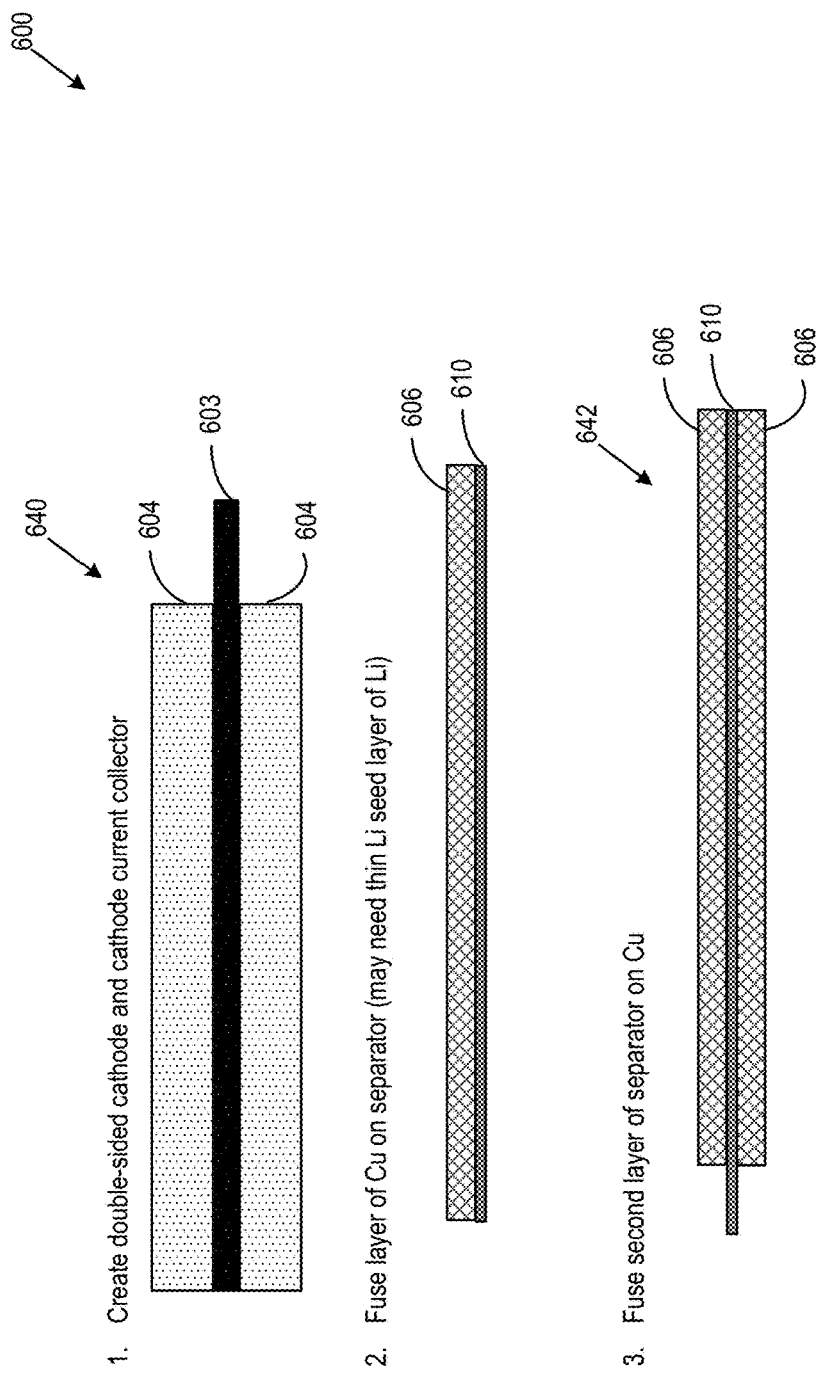
FIG. 6 is a diagram of a method of construction of portions of the basic Li-Metal battery system of FIG. 5 consistent with embodiments disclosed herein.

FIG. 6 is a diagram of a method 600 of construction of portions of the basic Li-Metal battery system 500 of FIG. 5 consistent with embodiments disclosed herein. The layers can be constructed such that a double-sided cathode 604 is constructed around a current collector 603. A layer of copper 610 can be attached to a separator 606 (e.g., separation layer), which may include a thin Lithium seed layer (not shown) between the copper 610 and the separator 606. Then a second layer of the separator 606 can be attached to the other side of the copper 610, again with a possible addition of a Lithium seed layer (not shown) between the two. These layers 640 and 642 can then be alternated to form a doubled-sided anode and cathode with a separator between. An insulating material can be added to the ends to prevent accidental contact with a current collector and/or bus. An anode bus can be added at one end of the layers, connecting the anode current collectors, and a cathode bus can be added at an opposite end to connect together the cathode current collectors.

Figure 7:
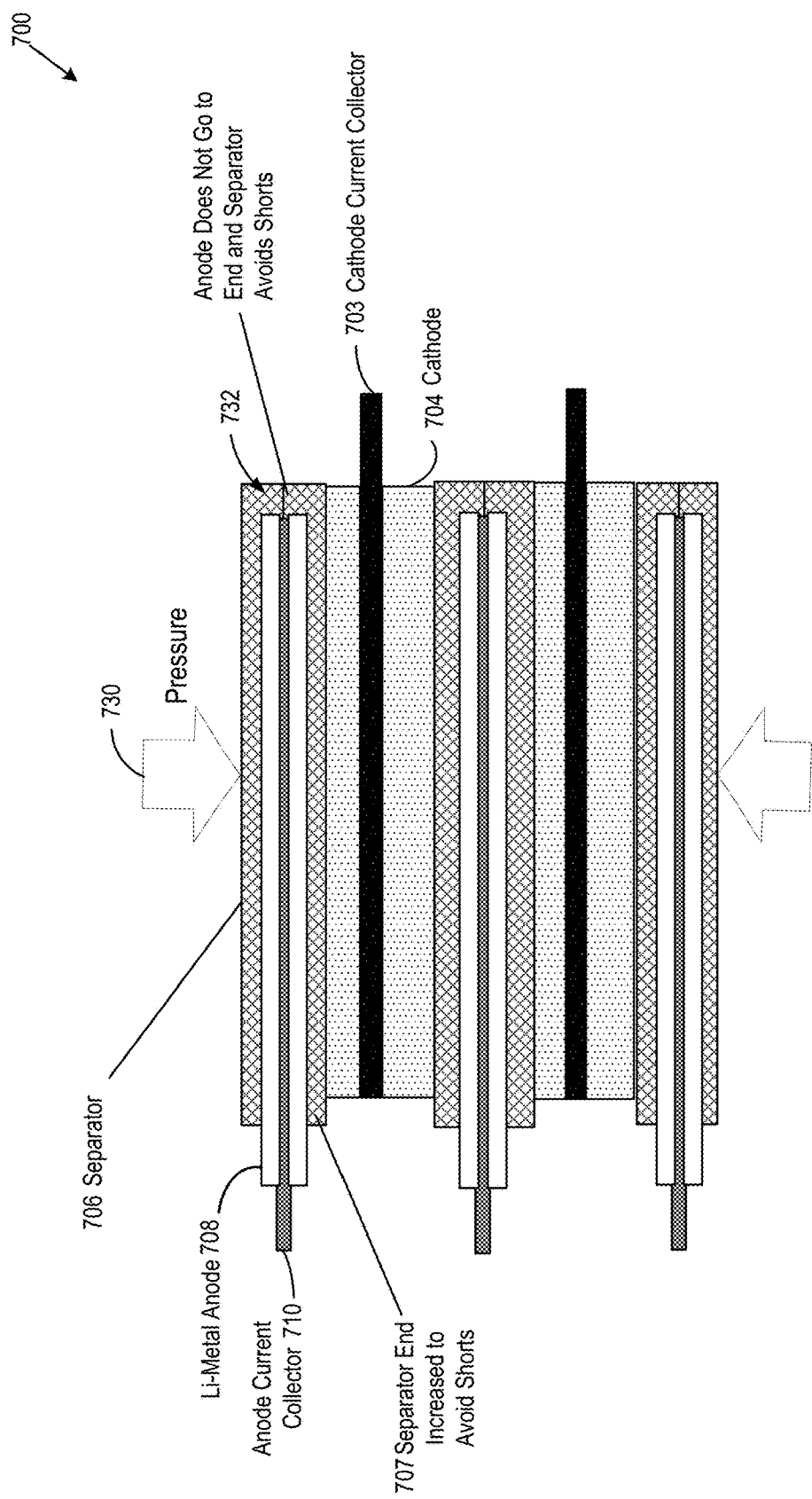
FIG. 7 is a diagram illustrating a Li-Metal battery system internal construction to avoid shorts, consistent with embodiments disclosed herein.

FIG. 7 is a diagram illustrating a Li-Metal battery system 700 internal construction to avoid shorts, consistent with embodiments disclosed herein. In some embodiments, an end of an anode current collector 710 of an anode 708 is prevented from touching the cathode material by extending a separator 706 past the end of the anode current collector 710 to form an insulated end 732. This can help prevent accidental shorting of the anode current collector 710 with a cathode bus or with an adjacent cathode strip 704. The anode material 708 and/or the separator 706 can extend beyond the end of the cathode 704 to allow for an end insulation or separator 707 to be placed at the end of the cathode material 704 and/or a cathode current collector 703. This can help prevent accidental shorting of the cathode current collector 703 with an anode bus. Stack pressure 730 can be provided by end plates and/or by a battery body.

Figure 8:
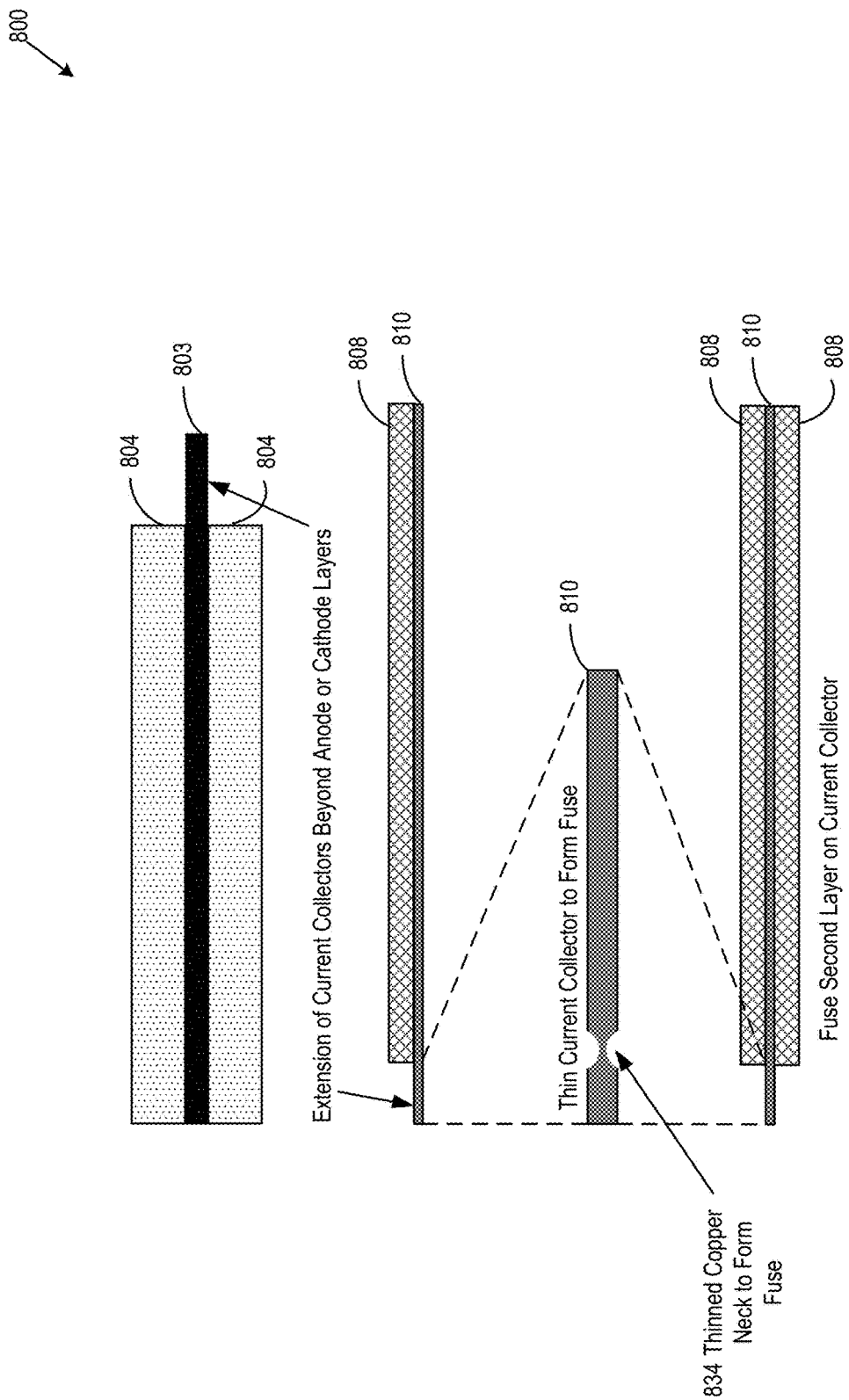
FIG. 8 is a diagram of features of the Li-Metal battery system of FIG. 7 consistent with embodiments disclosed herein.

FIG. 8 is a diagram of features 800 of the Li-Metal battery system 700 of FIG. 7 consistent with embodiments disclosed herein. Current collectors 803 and 810 can be extended beyond an anode 808 or a cathode 804 material. This allows the current collector 803 or 810 to be folded over and connected with other current collectors to form a bus. The current collector 810 can be formed (e.g., pressed, compressed, etched, machined, etc.) to form a smaller neck 834 (or thinned collector portion or neck formation) in the current collector 810. The smaller neck 834 can act as a fuse which causes an open circuit if current is sourced beyond a threshold. The neck 834 may be formed by thinning out a strip—for example, compressing a 10µ thick strip to 0.25 µ. It may also be formed by cutting or etching the neck 834 in a strip. For example, a 5-mm-wide strip may be cut to create a 0.5 mm neck 834. Such restrictions limit the amount of current available to a dendrite short. A third alternative is to treat the neck area, for example, by oxidation, to increase its inherent resistance. A significant current carrying short can cause the restriction (e.g., neck or thinned collector portion) to heat and break (or blow) like a fuse. A minor short may supply insufficient current to break the fuse, but the fuse can be configured such that the low current is also insufficient to create a catastrophic cell failure.

Figure 9:
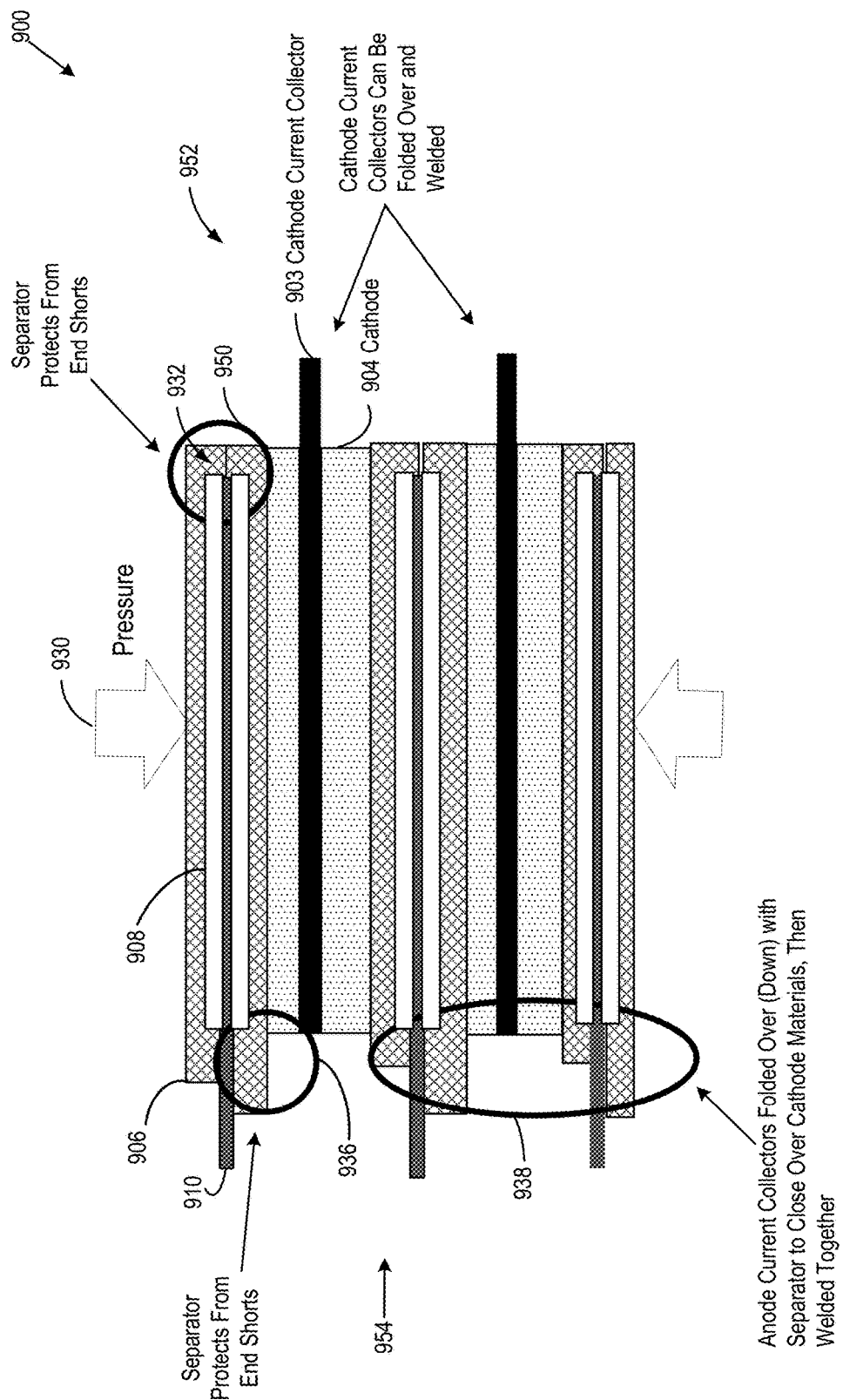
FIG. 9 is a diagram illustrating a Li-Metal battery system internal construction with folding features consistent with embodiments disclosed herein.
Figure 10:
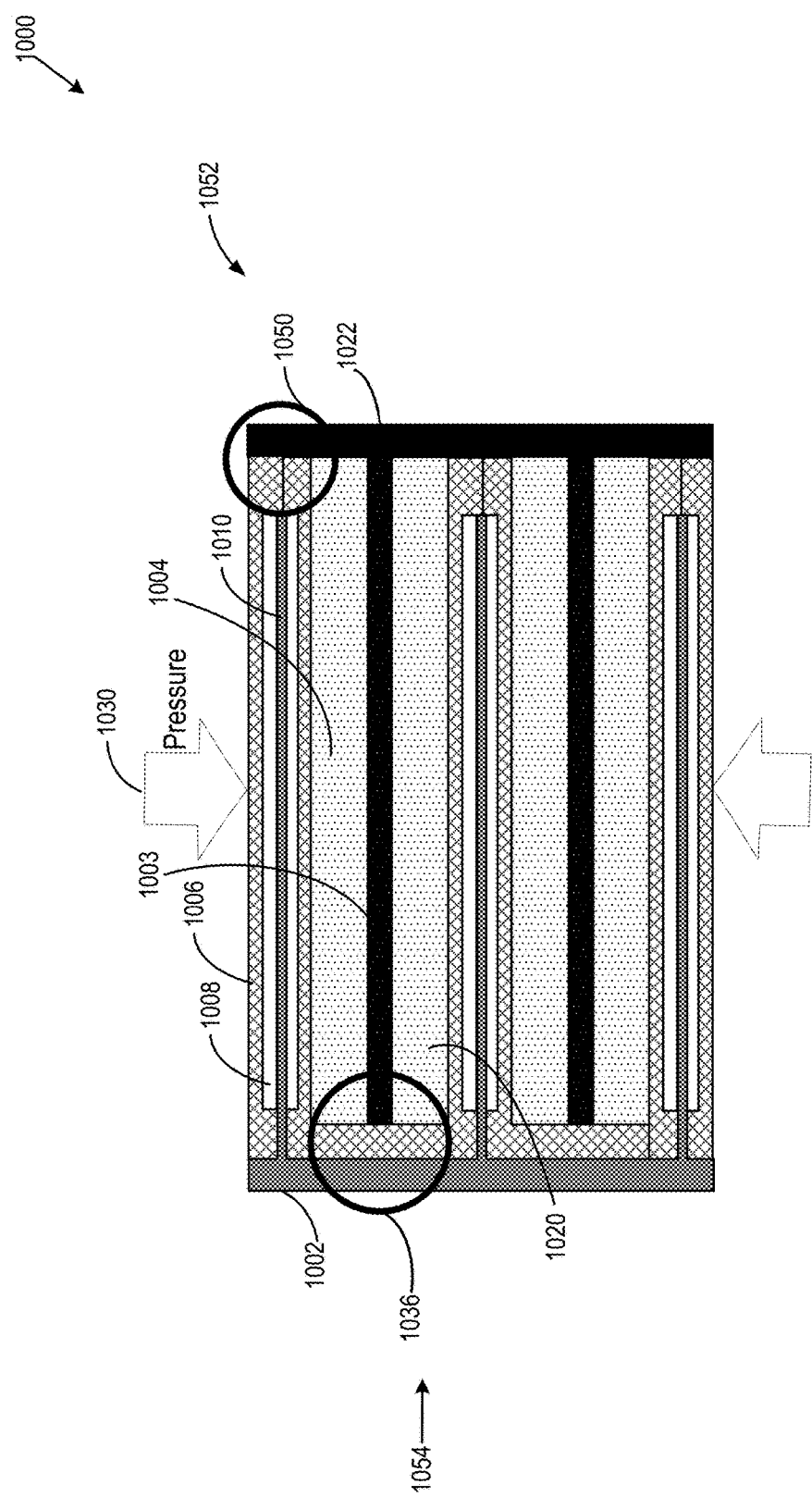
FIG. 10 is a diagram illustrating the Li-Metal battery system internal construction of FIG. 9 with folding features consistent with embodiments disclosed herein.

FIGS. 9-10 show a Li-Metal battery system internal construction with folding features, including an instance of the embodiment before folding (FIG. 9) and an instance of the embodiment after folding (FIG. 10).

FIG. 9 is a diagram illustrating a Li-Metal battery system 900 internal construction with folding features (including 936, 938) consistent with embodiments disclosed herein. In the embodiment shown, an anode current collector ending 950 within an insulated end 932 is within a separator material 906 and does not extend through the separator material 906. The anode 908, being formed around the anode current collector 910 also does not extend through the separator material 906. The cathode side 952 is protected from a short by this gap between an anode current collector 910 end and the ending of the separator 906. The separator 906 is extended on the anode current collector side such that when the folding feature 936 (or extension) is folded, it will cover an end of a cathode material 904 and/or a current collector 903. The current collectors 910 and 903 can be folded over and welded to form a bus. Stack pressure 930 can be exerted on the layers as shown.

FIG. 10 is a diagram illustrating an instance of the Li-Metal battery system 1000 internal construction when FIG. 9 is folded with folding features consistent with embodiments disclosed herein. In the embodiment shown, an anode current collector ending 1050 is within a separator material 1006 and does not extend through to a cathode bus 1022 formed by folding cathode current collectors 1003 that extend at a cathode end 1052. The cathode bus 1022 is protected from a short by this gap between the anode current collector ending 1050 and the ending of the separator 1006. The separator 1006 is extended on the anode current collector side such that when an extension 1036 is folded, it will cover an end of a cathode material 1020 and/or the current collector 1003 on the anode side 1054. Current collectors 1010 and 1003 can be folded over and welded to form buses 1002 and 1022. Cathode current collectors 1003 are insulated from the Li-Metal anode material 1008, but are exposed to cathode material 1004 on the cathode side 1052.

Once the features in FIG. 9 have been folded to form FIG. 10, the layers compressed with a pressure 1030 can be inserted into a battery case, filled with electrolyte and heat-treated to solidify the battery. The top and bottom of the layers can be skimmed to form a better alignment.

Figure 11:
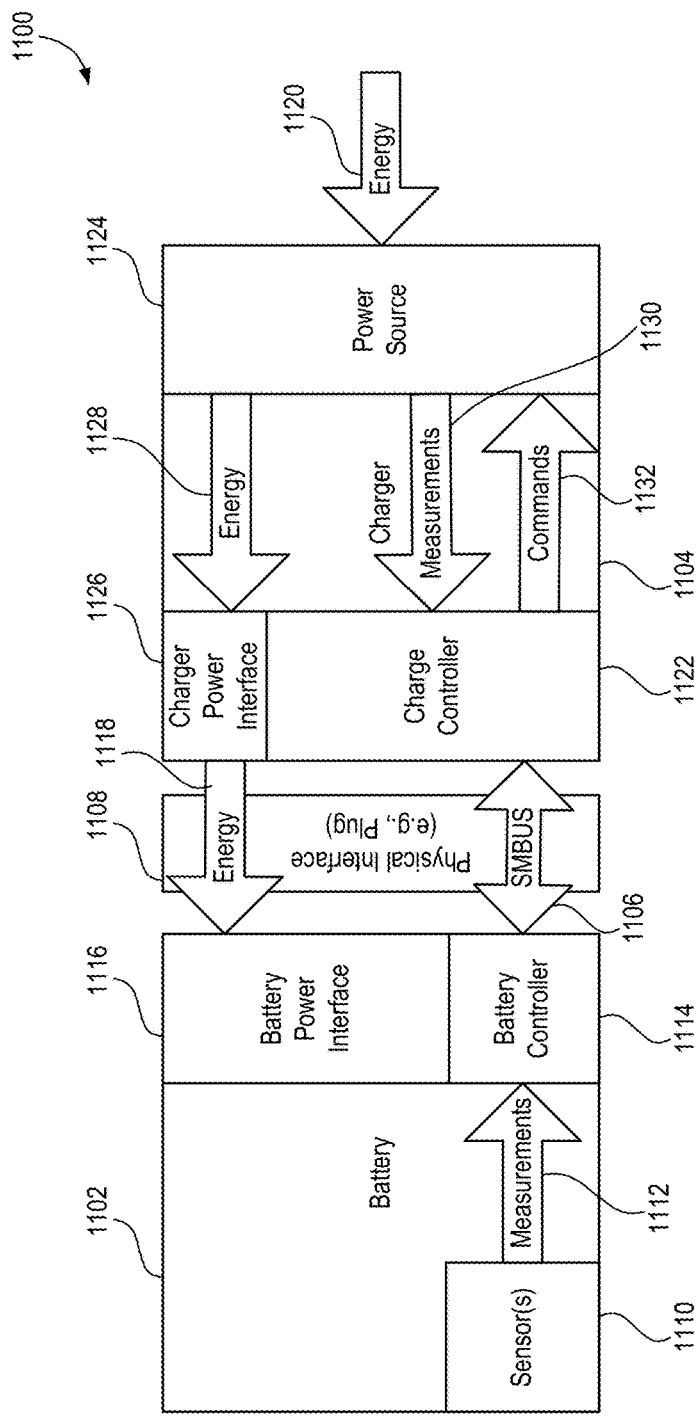
FIG. 11 is a diagram of a battery system consistent with embodiments disclosed herein.

FIG. 11 shows a diagram 1100 of a battery 1102 connected to a charger 1104 through a physical interface 1108 using an SMBUS 1106 for communication. The battery 1102 can include sensors 1110, a battery power interface 1116 and a battery controller 1114. The sensors 1110 can measure aspects of the battery 1102, such as impedance, open circuit voltage (OCV), charge current, charge voltage, etc. The battery power interface 1116 can receive an energy 1118 over the physical interface 1108 from the charger 1104 and provide the energy 1118 to the battery 1102. The battery power interface 1116 can also include safety features that prevent damage to the battery 1102 (e.g., overvoltage protection, thermal shutdown, etc.). The battery controller 1114 can receive measurements 1112 from the sensors 1110 and communicate with the charger 1104 over a control channel such as the SMBUS 1106. The battery controller 1114 can also include stored information such as creation date of the battery 1102, number of charge cycles, tables of cutoff thresholds, tables of charge state based on impedance, charge state equations, charge state equation constants, original OCV of the battery 1102, original charge time of the battery 1102, original impedance of the battery 1102, etc.

The charger 1104 can include a charge controller 1122, a power source 1124 and a charger power interface 1126. The charge controller 1122 can receive messages over a control channel (such as the SMBUS 1106 or I2C (inter-integrated circuit bus), etc.), configure the power source 1124 (such as through commands 1132) and receive measurements 1130. The power source 1124 can provide an energy 1128 to be delivered to and/or charge the battery 1102. The power source 1124 can be configured by the charge controller 1122, including configurations such as constant current and/or constant voltage settings. The power source 1124 can provide the measurements 1130 to the charge controller 1122, such as voltage, current, impedance and power information including measurements and/or estimates. The power source 1124 can receive an input energy 1120 (such as from an AC adapter or wall outlet) to convert into the energy 1128 to charge the battery 1102. The charger power interface 1126 can couple the energy 1128 from the power source 1124 to the battery power interface 1116. The charger 1104 (such as the charger power interface 1126, etc.) can include safety features (e.g., overvoltage, thermal and/or power protection).

The battery controller 1114 can send messages that cause the charger 1104 (by way of the charge controller 1122) to perform actions. For example, the battery controller 1114 can send a message using an SMBUS protocol to the charge controller 1122 which causes the charge controller 1122 to modify charging settings of the power source 1124 that provides the energy 1118 to the battery 1102 over the charger power interface 1126 to the battery power interface 1116 via the physical interface 1108. The battery controller 1114 can send messages to the charge controller 1122 to request a constant current charge at a specified constant current value, a constant voltage charge at a specified constant voltage value, that charging stop at a specified cutoff current threshold, that charging stop at a specified voltage cutoff threshold, that charging stop at a specified cutoff impedance threshold, etc. In addition, the battery controller 1114 can send messages to the charge controller 1122 to enqueue a series of actions with specified thresholds to cause a transition from one action to another action in the queue. In other embodiments, the charge controller 1122 can perform the same or similar tasks.

In some embodiments, the battery controller 1114 can communicate with the charge controller 1122 to cause a series of constant current step charges. The battery controller 1114 can send a series of messages to the charge controller 1122 to dynamically alter constant current step charges.

It should be recognized that FIG. 11 represents an embodiment, but that elements of the system can be located and/or combined differently. For example, the sensors 1110 can be located in the charger 1104 with measurements of the battery 1102 occurring across the physical interface 1108. Other combinations are also possible.

Depending on the embodiment, the charging instructions can reside in software, firmware and/or circuits of the charge controller 1122. Embodiments described herein can also be integrated in systems on chips (SoCs) with integrated chargers, power management integrated circuits (PMICs) with integrated chargers, etc.

Figure 12:
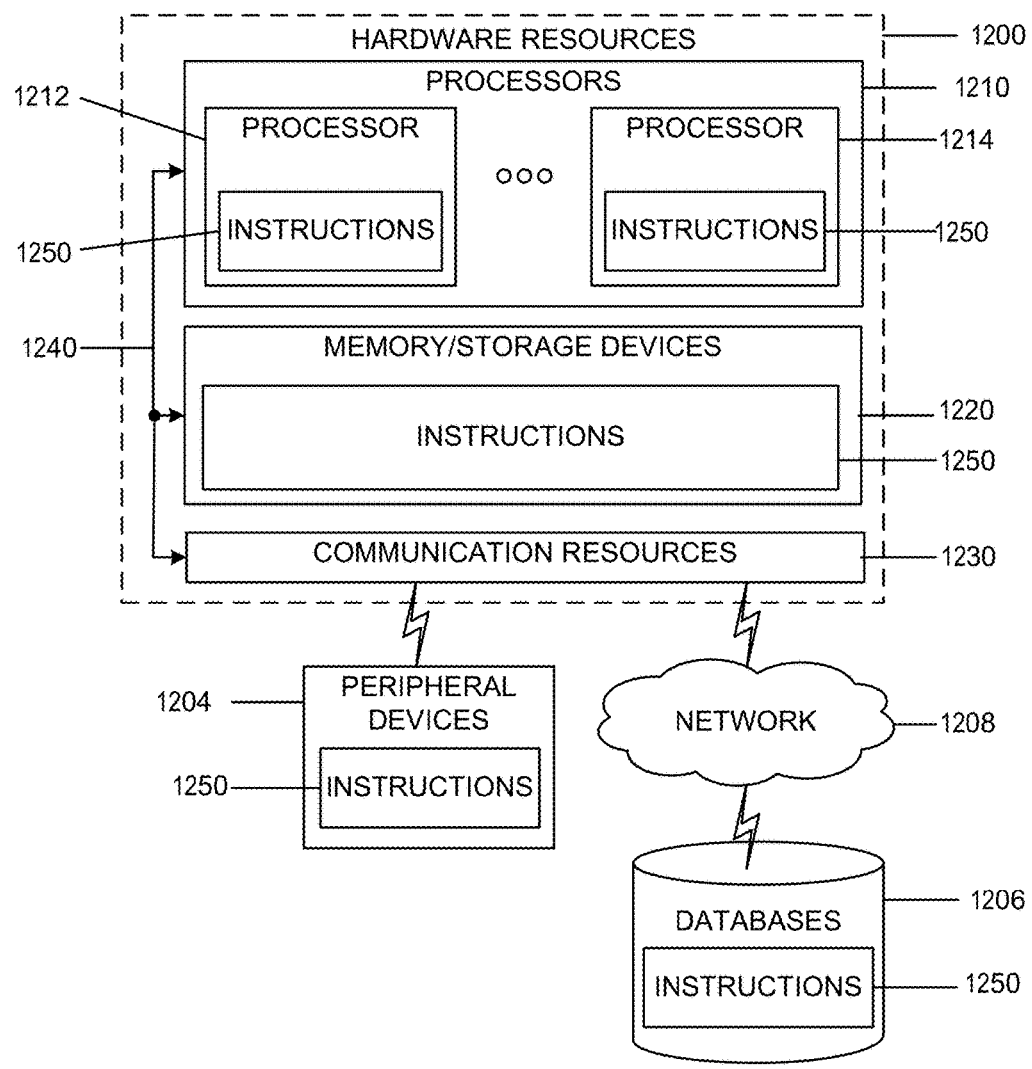
FIG. 12 is a block diagram illustrating a computing system and components consistent with embodiments disclosed herein.

FIG. 12 is a block diagram illustrating components, according to some example embodiments, able to read instructions from a machine-readable or computer-readable medium (e.g., a machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which are communicatively coupled via a bus 1240.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214. The memory/storage devices 1220 may include main memory, disk storage, or any suitable combination thereof.

The communication resources 1230 may include interconnection and/or network interface components or other suitable devices to communicate with one or more peripheral devices 1204 and/or one or more databases 1206 via a network 1208. For example, the communication resources 1230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 and/or the databases 1206. Accordingly, the memory of the processors 1210, the memory/storage devices 1220, the peripheral devices 1204, and the databases 1206 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as ASIC, SoC, SiP, FPGA, PAL, PLA, FPLA, PLD, or other customized or programmable devices. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

EXAMPLES

The following examples pertain to further embodiments.

Example 1 is a battery using reduced stack force. The batter includes a battery body having a length, a width and a depth, where an edge of the battery is defined by the length and the width of one or more sets of layers within the battery.

The batter includes a battery body having a length, a width and a depth, where a side of the battery is defined by the length and depth of the one or more sets of layers within the battery, and where an edge area of the battery body is larger than a side area of the battery body. The batter includes a battery body having a length, a width and a depth, where a variety of layers having substantially the length and substantially the width, a set of layers from the variety of layers including a cathode current collector layer. The batter includes a battery body having a length, a width and a depth, where a variety of layers having substantially the length and substantially the width, a set of layers from the variety of layers including a cathode material layer attached to the cathode current collector layer, and an anode current collector layer, the anode current collector layer including a neck formation forming a fuse. The batter includes a battery body having a length, a width and a depth, where a variety of layers having substantially the length and substantially the width, a set of layers from the variety of layers including a Lithium-metal layer attached to the anode current collector layer and including Lithium metal, and a separator layer disposed between the Lithium-metal layer and the cathode material layer and designed to insulate the cathode material layer from the Lithium-metal layer.

Example 2 is the battery of Example 1, where the fuse is designed to break a connection between an anode bus and the current collector attached to the Lithium-metal layer.

Example 3 is the battery of Example 1, where the fuse is designed to break the connection when a current draw from the Lithium-metal layer is above a threshold or threshold range. Example 4 is the battery of Example 1, where the neck formation is thinner than a majority of the anode current collector layer.

Example 5 is the battery of Example 1, where the neck formation is modified to give it a higher resistivity than the rest of the current collector.

Example 6 is the battery of Example 5, where the neck formation is modified by oxidation.

Example 7 is the battery of Example 1, where the battery body has substantially flat sides. Example 8 is the battery of Example 1, where the battery further includes a first edge plate and a second edge plate, where the first edge plate is placed at a first end of the variety of layers and the second edge plate is placed at a second end of the variety of layers, and where the battery body is further designed to provide a pressure to a first edge plate and a second edge plate.

Example 9 is the battery of Example 1, further including one or more bands placed around the variety of layers and designed to provide a pressure to the plates.

Example 10 is the battery of Example 1, further including a positive terminal attached to one or more cathode collector layers, and a negative terminal attached to one or more anode collector layers.

Example 11 is the battery of Example 1, further including an electrolyte disposed between the layers.

Example 12 is the battery of Example 1, where an edge-wise construction provides a greater energy density than a sheet construction or a cylinder construction by enabling thinner layers or more pressure.

Example 13 is a method of constructing a battery. The method includes disposing two or more layer sets, including providing a first anode current collector layer, and disposing a first anode material layer adjacent to a first side of the first anode current collector layer. The method includes disposing two or more layer sets, including disposing a second anode material layer adjacent to a second side of the first anode current collector layer, and disposing a first separator adjacent to the first anode material layer, a first end of the first separator layer extending beyond a first end of the first anode current collector layer, first anode material layer and second anode material layer. The method includes disposing two or more layer sets, including disposing a second separator adjacent to the second anode material layer, a first end of the second separator layer extending beyond the first end of the first anode current collector layer, first anode material layer and second anode material layer, and a second end of the second separator extending beyond a second end of the first separator, and disposing a first cathode material layer adjacent to the second separator. The method includes disposing two or more layer sets, including disposing a first cathode current collector layer adjacent to the first anode material layer, and disposing a first cathode material layer adjacent to the first cathode current collector layer. The method includes disposing two or more layer sets, including folding the first anode current collector layer and the second end of the second separator over the first cathode material layer and second cathode material layer, with the second end of the second separator covering the first cathode material layer and second cathode material layer and insulating the first anode current collector from the first cathode current collector, the first cathode material layer and the second cathode material layer.

Example 14 is the method of Example 13, further including folding over cathode current collectors of two or more layers to form a cathode bus.

Example 15 is the method of Example 13, further including folding over two or more anode current collectors of two or more layers to form an anode bus.

Example 16 is the method of Example 13, further including welding two or more anode current collectors of two or more layers to form an anode bus.

Example 17 is the method of Example 13, further including forming a fuse portion of an anode current collector layer designed to break a connection between anode material layers and an anode bus.

Example 18 is the method of Example 17, where forming the fuse portion of an anode current collector layer further includes making a neck portion of the anode current collector thinner than a body of the anode current collector by stretching the neck portion.

Example 19 is the method of Example 17, where forming the fuse portion of an anode current collector layer further includes making a neck portion of the anode current collector thinner than a body of the anode current collector by compressing the neck portion.

Example 20 is the method of Example 13, further including inserting the two or more layer sets, a first edge plate and a second edge plate within a battery body.

Example 21 is the method of Example 20, further including disposing an electrolyte in the battery body.

Example 22 is the method of Example 13, further including placing one or more bands around the two or more layer sets to apply pressure to the two or more layer sets.

Example 23 is a computing device. The computing device includes a processor mounted on a substrate, a memory unit capable of storing data, a graphics processing unit, and an antenna within the computing device. The computing device includes a display on the computing device, a battery within the computing device, and a power amplifier within the processor. The computing device includes a voltage regulator within the processor, where the battery includes a battery body having a length, a width and a depth, where an edge of the battery is defined by the length and the width of one or more sets of layers within the battery, and a side of the battery is defined by the length and depth of the one or more sets of layers within the battery. The computing device includes a voltage regulator within the processor, where the battery includes a battery body having a length, a width and a depth, where an edge area of the battery body is larger than a side area of the battery body, a variety of layers having substantially the length and substantially the width, a set of layers from the one or more sets of layers including a cathode current collector layer, a cathode material layer attached to the cathode current collector layer. The layers further include an anode current collector layer, the anode current collector layer including a neck formation forming a fuse, a Lithium-metal layer attached to the anode current collector layer and including Lithium metal, and a separator layer disposed between the Lithium-metal layer and the cathode material layer and designed to insulate the cathode material layer from the Lithium-metal layer.

Example 24 is the computing device of Example 23, further including a charging sensor.

Example 25 is the computing device of Example 23, further including an anode collector bus attached to the anode current collector layer.

Example 26 is the computing device of Example 25, where anode collector bus is attached to a negative terminal of the battery.

Example 27 is the computing device of Example 23, further including a cathode collector bus attached to the cathode current collector layer.

Example 28 is the computing device of Example 27, where cathode collector bus is attached to a positive terminal of the battery.

Example 29 is the computing device of Example 23, where the battery has flat edges and sides.

Reference throughout this specification to "an example" means that a particular feature, structure, or characteristic described in connection with the example is included in at least one embodiment of the present invention. Thus, appearances of the phrase "for example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems, or divided or combined in other ways. In addition, it is contemplated that parameters/attributes/aspects/etc. of one embodiment can be used in another embodiment. The parameters/attributes/aspects, etc., are merely described in one or more embodiments for clarity, and it is recognized that the parameters/attributes/aspects, etc., can be combined with or substituted for parameters/attributes/aspects, etc., of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A battery using reduced stack force, comprising:
  a battery body having a length, a width and a depth, wherein:
    an edge of the battery is defined by the length and the width of one or more sets of layers within the battery; and
    a side of the battery is defined by the length and depth of the one or more sets of layers within the battery, wherein an edge area of the battery body is larger than a side area of the battery body; and
  a plurality of layers having substantially the length and substantially the width, a set of layers from the plurality of layers comprising:
    a cathode current collector layer;
    a cathode material layer coupled to the cathode current collector layer;
    an anode current collector layer, the anode current collector layer comprising a neck formation forming a fuse, wherein the neck formation is thinner than a thickness of the anode current collector layer;
    a Lithium-metal layer coupled to the anode current collector layer and comprising Lithium metal; and
    a separator layer disposed between the Lithium-metal layer and the cathode material layer and configured to insulate the cathode material layer from the Lithium-metal layer.

2. The battery of claim 1, wherein the fuse is configured to break a connection between an anode bus and the current collector coupled to the Lithium-metal layer.

3. The battery of claim 1, wherein the fuse is configured to break the connection when a current draw from the Lithium-metal layer is above a threshold or threshold range.

4. The battery of claim 1, wherein the neck formation is modified to give it a higher resistivity than the rest of the current collector.

5. The battery of claim 4, wherein the neck formation is modified by oxidation.

6. The battery of claim 1, wherein the battery body has substantially flat sides.

7. The battery of claim 1, wherein the battery further comprises a first edge plate and a second edge plate, wherein the first edge plate is placed at a first end of the plurality of layers and the second edge plate is placed at a second end of the plurality of layers, and
wherein the battery body is further configured to provide a pressure to a first edge plate and a second edge plate.

8. The battery of claim 1, further comprising one or more bands placed around the plurality of layers and configured to provide a pressure to the plates.

9. The battery of claim 1, further comprising a positive terminal coupled to one or more cathode collector layers, and a negative terminal coupled to one or more anode collector layers.

10. The battery of claim 1, further comprising an electrolyte disposed between the layers.

11. The battery of claim 1, wherein the battery is made by an edge-wise construction that provides a greater energy density than a sheet construction or a cylinder construction by enabling thinner layers or more pressure.

12. A method of constructing a battery, comprising:
disposing two or more layer sets, comprising:
providing a first anode current collector layer;
disposing a first anode material layer adjacent to a first side of the first anode current collector layer;
disposing a second anode material layer adjacent to a second side of the first anode current collector layer;
disposing a first separator adjacent to the first anode material layer, a first end of the first separator layer extending beyond a first end of the first anode current collector layer, first anode material layer and second anode material layer;
disposing a second separator adjacent to the second anode material layer, a first end of the second separator layer extending beyond the first end of the first anode current collector layer, first anode material layer and second anode material layer, and a second end of the second separator extending beyond a second end of the first separator;
disposing a first cathode material layer adjacent to the second separator;
disposing a first cathode current collector layer adjacent to the first anode material layer; and
disposing a first cathode material layer adjacent to the first cathode current collector layer;
folding the first anode current collector layer and the second end of the second separator over the first cathode material layer and second cathode material layer, with the second end of the second separator covering the first cathode material layer and second cathode material layer and insulating the first anode current collector from the first cathode current collector, the first cathode material layer and the second cathode material layer; and
forming a fuse portion of an anode current collector layer configured to break a connection between anode material layers and an anode bus, wherein forming the fuse portion comprises making a neck portion of the anode current collector thinner than a body of the anode current collector.

13. The method of claim 12, further comprising folding over cathode current collectors of two or more layers to form a cathode bus.

14. The method of claim 12, further comprising folding over two or more anode current collectors of two or more layers to form an anode bus.

15. The method of claim 12, further comprising welding two or more anode current collectors of two or more layers to form an anode bus.

16. The method of claim 12, wherein making the neck portion of the anode current collector thinner than the body of the anode current collector comprises stretching the neck portion.

17. The method of claim 12, wherein making the neck portion of the anode current collector thinner than the body of the anode current collector comprises compressing the neck portion.

18. The method of claim 12, further comprising inserting the two or more layer sets, a first edge plate and a second edge plate within a battery body.

19. The method of claim 18, further comprising disposing an electrolyte in the battery body.

20. The method of claim 12, further comprising placing one or more bands around the two or more layer sets to apply pressure to the two or more layer sets.

21. A computing device comprising:
a processor mounted on a substrate;
a memory unit capable of storing data;
a graphics processing unit;
an antenna within the computing device;
a display on the computing device;
a battery within the computing device;
a power amplifier within the processor; and
a voltage regulator within the processor,
wherein the battery comprises:
a battery body having a length, a width and a depth, wherein:
an edge of the battery is defined by the length and the width of one or more sets of layers within the battery; and
a side of the battery is defined by the length and depth of the one or more sets of layers within the battery,
wherein an edge area of the battery body is larger than a side area of the battery body;
a plurality of layers having substantially the length and substantially the width, a set of layers from the one or more sets of layers comprising:
a cathode current collector layer;
a cathode material layer coupled to the cathode current collector layer;
an anode current collector layer, the anode current collector layer comprising a neck formation forming a fuse, wherein the neck formation is thinner than a thickness of the anode current collector layer;
a Lithium-metal layer coupled to the anode current collector layer and comprising Lithium metal; and
a separator layer disposed between the Lithium-metal layer and the cathode material layer and configured to insulate the cathode material layer from the Lithium-metal layer.

22. The computing device of claim 21, further comprising a charging sensor.

23. The computing device of claim 21, further comprising an anode collector bus coupled to the anode current collector layer.

24. The computing device of claim 23, wherein anode collector bus is coupled to a negative terminal of the battery.

25. The computing device of claim 21, further comprising a cathode collector bus coupled to the cathode current collector layer.

26. The computing device of claim 25, wherein cathode collector bus is coupled to a positive terminal of the battery.

27. The computing device of claim 21, wherein the battery has flat edges and sides.

* * * * *